United States Patent
Branagh et al.

(10) Patent No.: US 11,080,626 B2
(45) Date of Patent: Aug. 3, 2021

(54) JOB ASSIGNMENT OPTIMIZATION

(71) Applicant: International Business Machines Corporation, Armonk, NY (US)

(72) Inventors: Elaine M. Branagh, Austin, TX (US); Randall L. Cogill, Dublin (IE); Aliza R. Heching, Clifton, NJ (US); Akihiro Kishimoto, Dublin (IE); Nicole L. Lechelt, Calgary (CA); Pitipong J. Lin, Brookline, MA (US); Yin Long, Punggol Central (SG); Joe Naoum-Sawaya, London (CA); Surya S. K. Sajja, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 605 days.

(21) Appl. No.: 15/072,516

(22) Filed: Mar. 17, 2016

(65) Prior Publication Data

US 2017/0270456 A1 Sep. 21, 2017

(51) Int. Cl.
*G06Q 10/06* (2012.01)
*G06Q 10/10* (2012.01)
*G06Q 30/02* (2012.01)

(52) U.S. Cl.
CPC ........... *G06Q 10/063112* (2013.01); *G06Q 10/06398* (2013.01); *G06Q 10/1053* (2013.01)

(58) Field of Classification Search
CPC ........ G06Q 10/06; G06Q 10/10; G06Q 30/02; G06F 17/30

USPC ........................................................ 705/7.14
See application file for complete search history.

(56) References Cited

U.S. PATENT DOCUMENTS

| | | | |
|---|---|---|---|
| 2002/0169658 A1* | 11/2002 | Adler | G06Q 30/0205 705/7.28 |
| 2005/0114203 A1 | 5/2005 | Savitsky et al. | |
| 2007/0160964 A1 | 7/2007 | Albertsson | |
| 2007/0208572 A1 | 9/2007 | Habighler et al. | |
| 2012/0078803 A1* | 3/2012 | MacArthur | G06Q 10/063112 705/319 |
| 2012/0123956 A1* | 5/2012 | Chenthamarakshan | G06Q 10/10 705/321 |

(Continued)

*Primary Examiner* — Nga B Nguyen
(74) *Attorney, Agent, or Firm* — Cantor Colburn LLP; Kurt Goudy

(57) ABSTRACT

An aspect of providing job assignment optimization includes creating a feature vector from features extracted from a new job request. Each of the features is associated with a constraint on minimum requirements with respect to a level of experience of a potential candidate. An aspect further includes creating a feature vector for each employee that includes skills attributed to the employee and instances that each of the skills have been completed, searching feature vectors generated from the employee database for the minimum requirements indicated in the new job request feature vector, searching the feature vectors of the database for the minimum requirements indicated by constraints associated with the new job request, modeling aggregate utility of past experience of employees as a weighted sum of applied utility functions, and generating a score indicating a difference between a potential post assignment and a pre-assignment utility. An aspect also includes outputting qualified candidates.

14 Claims, 3 Drawing Sheets

(56) References Cited

U.S. PATENT DOCUMENTS

| | | | |
|---|---|---|---|
| 2013/0138588 A1* | 5/2013 | Mehta | G06F 17/30554 706/12 |
| 2013/0218619 A1 | 8/2013 | Friedlander et al. | |
| 2013/0290205 A1* | 10/2013 | Bonmassar | G06Q 10/1053 705/321 |
| 2014/0095236 A1 | 4/2014 | Podgurny et al. | |
| 2014/0122355 A1* | 5/2014 | Hardtke | G06Q 10/105 705/321 |
| 2014/0143165 A1* | 5/2014 | Posse | G06Q 50/01 705/319 |
| 2014/0372329 A1* | 12/2014 | Menon | G06Q 10/1053 705/319 |
| 2015/0046357 A1* | 2/2015 | Danson | G06Q 10/1053 705/321 |
| 2015/0112983 A1* | 4/2015 | Srivastava | G06F 17/3053 707/732 |
| 2015/0127565 A1* | 5/2015 | Chevalier | G06Q 10/00 705/319 |
| 2015/0161566 A1* | 6/2015 | Cai | G06Q 10/1053 705/321 |
| 2015/0220884 A1* | 8/2015 | Kabdebon | G06Q 10/1053 705/321 |
| 2016/0012395 A1* | 1/2016 | Omar | G06Q 10/105 705/320 |
| 2016/0034583 A1* | 2/2016 | Agarwal | G06F 16/9535 707/706 |
| 2016/0124958 A1* | 5/2016 | Sinha | G06F 16/9535 707/733 |
| 2016/0170996 A1* | 6/2016 | Frank | G06F 16/24578 707/748 |
| 2016/0239783 A1* | 8/2016 | Sahu | G06Q 10/06398 |
| 2016/0292161 A1* | 10/2016 | Liu | G06Q 10/1053 |
| 2016/0320946 A1* | 11/2016 | Zhao | G06F 16/248 |
| 2016/0321613 A1* | 11/2016 | Wang | G06Q 10/1053 |
| 2016/0350425 A1* | 12/2016 | Tripathi | G06F 17/30867 |
| 2016/0379170 A1* | 12/2016 | Pande | G06Q 10/06 705/321 |
| 2017/0011325 A1* | 1/2017 | Hanna | G06Q 10/06 |
| 2017/0060873 A1* | 3/2017 | Rathod | G06Q 10/00 |
| 2017/0061528 A1* | 3/2017 | Arora | G06Q 30/08 |
| 2017/0091303 A1* | 3/2017 | Rashid | G06F 16/9566 |

* cited by examiner

JOB ASSIGNMENT OPTIMIZATION

BACKGROUND

The invention relates generally to information processing, and more specifically, to job assignment optimization.

Oftentimes in a workplace environment, jobs are assigned to individuals that best match particular skill sets and experience. This type of assignment, i.e., identifying and assigning jobs to the best qualified people, can result in a skill pool in which experience becomes concentrated in a subgroup of the pool of individuals.

In addition, the experienced groups of individuals may become overwhelmed by incoming jobs that require experience while other individuals starve due to lack of experience. This can put organizations at risk due to the concentration of experience in selected individuals that become critical to future operations.

SUMMARY

According to an embodiment a method, system, and computer program product for providing job assignment optimization are provided. A method includes creating a feature vector from features extracted from a new job request. Each of the features is associated with a constraint on minimum requirements with respect to a level of experience of a potential candidate for assignment to the new job request. For each employee in an employee database, the method includes creating a feature vector that includes skills attributed to the employee and a number of instances that each of the skills has been completed by the employee. The method also includes searching feature vectors generated from the employee database for the minimum requirements indicated in the feature vector generated from the new job request, searching the feature vectors generated from the employee database for the minimum requirements indicated by constraints associated with the features in the new job request, modeling aggregate utility of past experience of employees as a weighted sum of applied utility functions, and generating, based on the modeling, a score indicating a difference between a potential post assignment utility and a pre-assignment utility. The method further includes outputting a list of qualified candidates that are ranked according to the score. The ranking, upon completion of the new job, furthers a balance in experience levels of the employees with respect to skills associated with the minimum requirements.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Exemplary embodiments provide job assignment optimization. The job assignment optimization assigns jobs to individuals in a manner that maximizes the overall experience of the pool of individuals and also maximizes the preparedness of the individuals based on forecasted future jobs. The output of the job assignment optimization is a ranked list of individuals that meet the minimum requirements of a job request and also balances the experience pool based on future predicted jobs. The exemplary job assignment optimization processes can be integrated with other workplace planning applications and may be used to augment job bidding tools.

Figure 1:
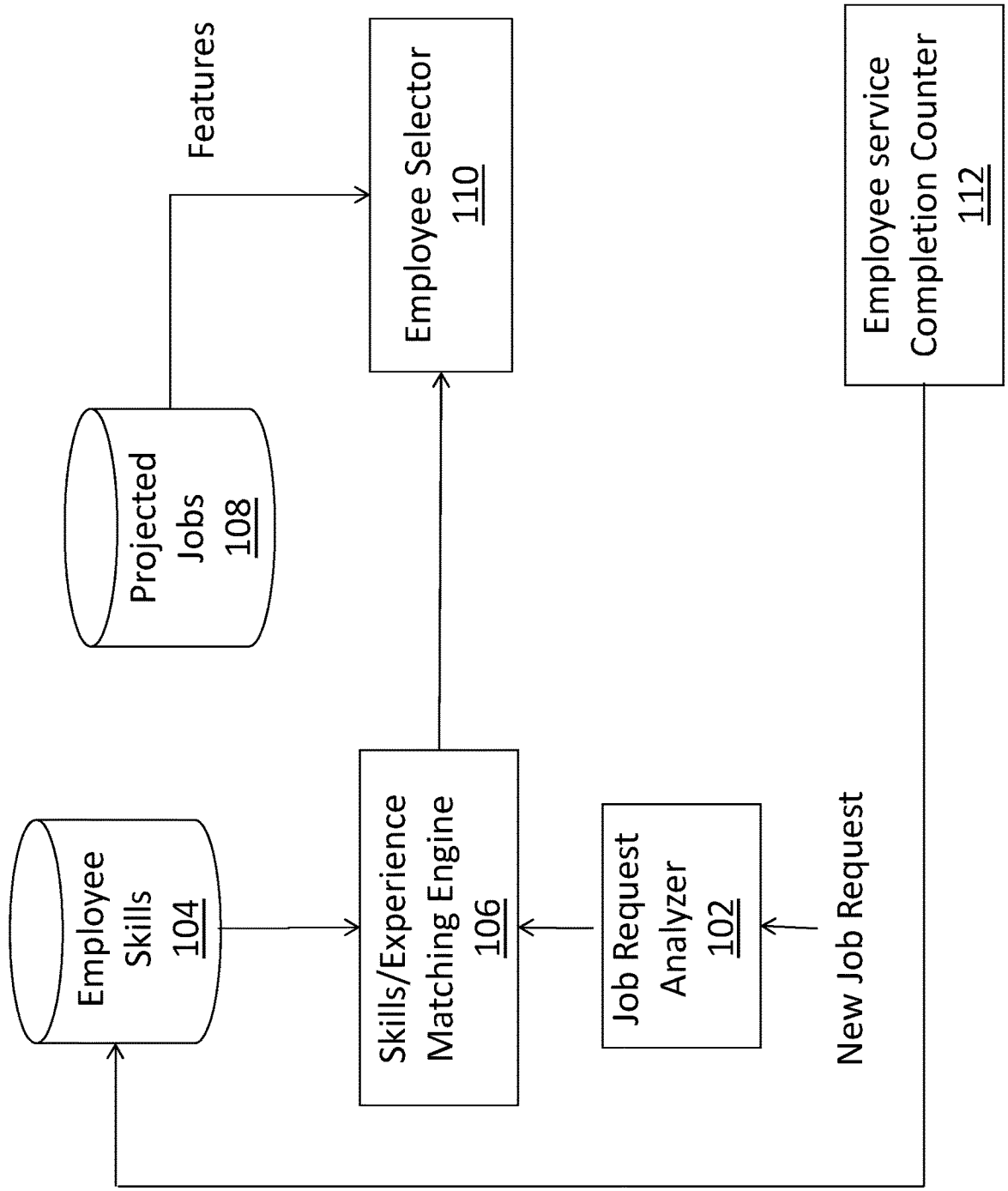
FIG. 1 depicts a block diagram of a component architecture upon which job assignment optimization may be implemented in accordance with an embodiment of the invention.

Turning now to FIG. 1, a component architecture 100 for implementing job assignment optimization will now be described in accordance with an embodiment.

The architecture 100 includes an employee skills database 104, a job request analyzer 102, and a new job request. The new job request indicates an incoming job that has yet to be assigned to an employee. In an embodiment, the job request includes monetary value of the job, an industry associated with the job, and a brand or division corresponding to the job. The new job request also includes minimum requirements with respect to a level of experience of a potential candidate for assignment to the job request. In an example, the job request corresponds to a request for proposal writing, the value of the proposal is $500,000, and the minimum requirements indicate the candidate must be written at least 5 proposals having a value of $100,000 or greater. An example industry could be banking, and a division could be finance.

In an embodiment, the employee skills database 104 stores employee profiles for each employee of an organization or enterprise. For example, the profiles may include identifying information of the employee, a set of skills attributed to the employee based on previously conducted work, an industry, division, department, and job title/description.

The job request analyzer 102 extracts features from the new job request and creates a feature vector from the extracted features. The features include minimum requirements with respect to a level of experience of a potential candidate for assignment to the job request. The features may indicate that the monetary value of the job is in a certain range. The vector may be implemented as a binary vector. For example, a component of the vector may indicate whether or not a certain job characteristic is present.

In addition, the job request analyzer 102 creates a feature vector for each employee in the employee skills database 104. The vectors include skills attributed to the employee and a number of instances that jobs containing each of the skills have been completed by the employees. The vectors may be implemented, e.g., as binary vectors. For example, for each feature indicated in the vector, a corresponding value indicates the number of instances the employee completed a task or job having the feature. In other words, the vector indicates a number of jobs previously completed that contain the feature. Once a job is completed by an individual, a corresponding vector for that individual is updated to indicate the additional experience acquired.

The architecture 100 of FIG. 1 also includes a skills/experience matching engine 106. The skills/experience matching engine 106 searches the feature vectors generated from the employee skills database 104 for the minimum requirements indicated in the feature vector of the new job request. The output of the skills/experience matching engine 106 reflects all employees having the minimum requirements provided in the job request.

Also included in the architecture 100 of FIG. 1 are a projected jobs database 108 and an employee selector engine 110. The projected jobs database 108 stores an anticipated demand for new job requests that have not yet been received. Demand for future jobs may be modeled from statistics extracted from past jobs. For example, suppose that the historical fraction of jobs containing a positive value for binary feature i if $f_i$. Assuming that feature values are independent and identically distributed, we may assume that the next incoming job has a positive value for feature i with probability $f_i$.

The employee selector engine 110 scores individuals determined to be qualified from the skills/experience matching engine 106. The scores are based on a utility function that measures the experience gained across all features together with other factors, if desired, and weighted based on expected future job characteristics (e.g., finding the individuals that gain the most experience that an enterprise anticipates it will need based on forecasted future jobs). The utility function is applied for each of the feature vectors generated from the employee database that meet the minimum requirements. The utility function factors in the features extracted from the future job requests. In an embodiment, the utility function is a log function.

The employee selector engine 110 models the aggregate utility of past experience of a qualified employee as a weighted sum of the applied utility functions. The employee selector engine 110 generates a score indicating a difference between potential post assignment utility and pre-assignment utility.

The employee selector engine 110 outputs a list of qualified candidates that are ranked according to the calculated score. The score may be calculated using a function, as follows:

Given a job with features i, where the individual has previously completed ei jobs with features i, the score is sum_i wi[log(ei+2)−log(ei+1)].

An employee service completion counter 112 updates the vector associated with the employee, once the employee selected for the job request has completed the job.

Figure 2:
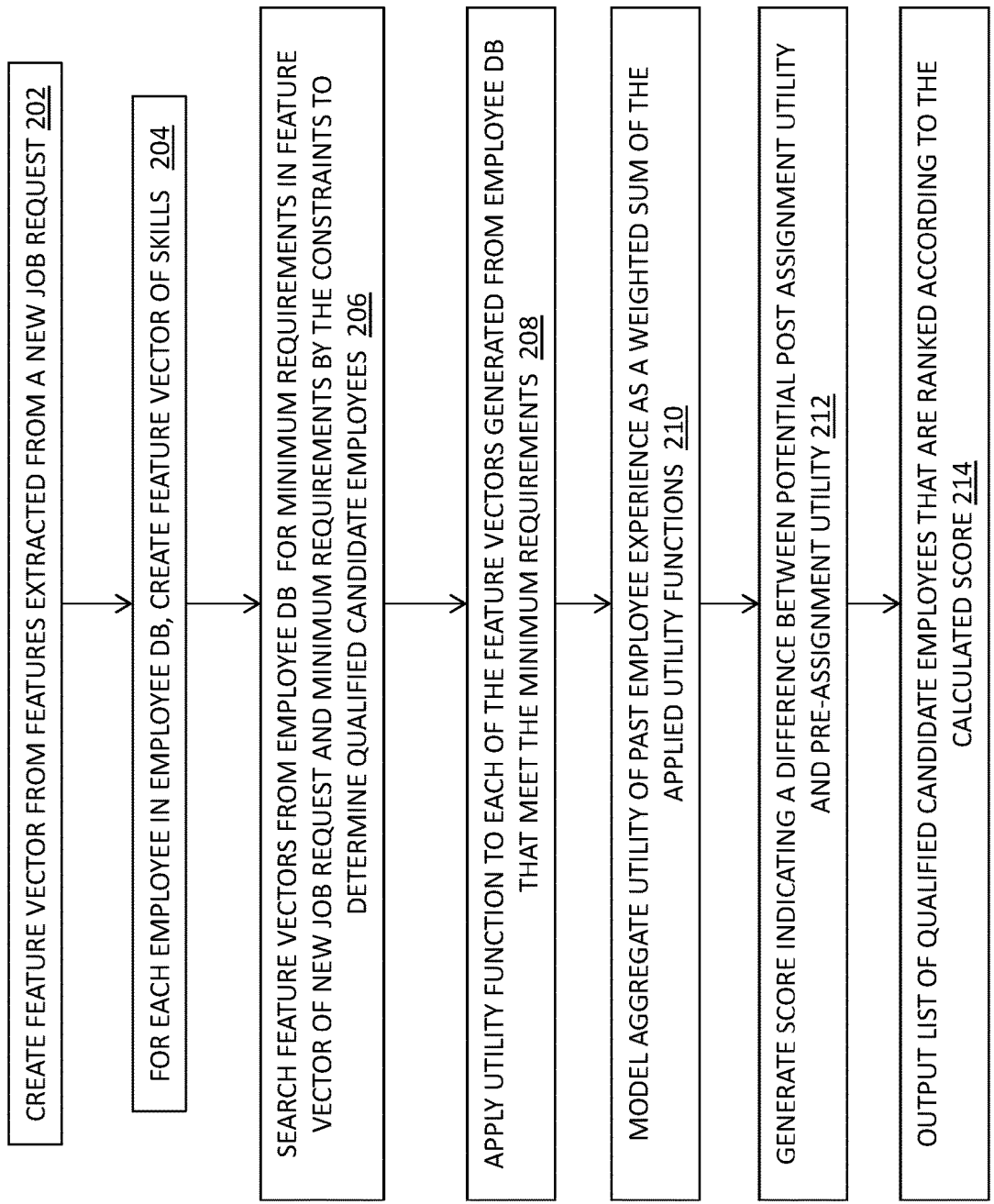
FIG. 2 depicts a flow diagram of a process for implementing job assignment optimization in accordance with an embodiment of the invention.

Turning now to FIG. 2, a process for implementing job assignment optimization will now be described in an embodiment.

In block 202, a feature vector is created from features extracted from a new job request. The features include minimum requirements with respect to a level of experience of a potential candidate for assignment to the job request. In block 204, for each employee in an employee database, a feature vector is created that includes skills attributed to the employee and a number of instances that each of the skills has been completed by the employee.

In block 206, the feature vectors generated from the employee database are searched for the minimum requirements indicated in the feature vector generated from the new job request. In block 208, for each of the feature vectors generated from the employee database that meet the minimum requirements, a utility function is applied. In block 210, the aggregate utility of past experience is modeled as a weighted sum of the applied utility functions.

In block 212, a score is generated that indicates a difference between potential post assignment utility and pre-assignment utility. In block 214, a list of qualified candidates is output. The list of qualified candidates is ranked according to the calculated score. Upon completion of the new job, the employee skills database is updated to reflect the additional experience acquired by the employee. The result of the scoring-based assignment further balances the experience pool.

The effects of the job assignment optimization may be illustrated using the following example. Suppose a job request has been received by an enterprise. The job is a proposal writing request. The features of the job are extracted and the minimum requirements of individuals that can perform the job are identified.

Job A has the following features:
Value>$5,000,000
Industry: Banking
The minimum experience requirements of Job A are:
Executed more than 2 proposal writing jobs with a value of at least $100,000.
Industry: Banking of Finance
Three individuals X, Y, and Z meet the minimum experience requirements:
X has the following experience:
Executed 10 proposal writing jobs with a value of $5,000,000 each
Industry: Banking
Y has the following experience:
Executed 3 proposal writing jobs with a value of $100,000 each.
Industry: banking
Z has the following experience:
Executed 2 proposal writing jobs with a value of $100,000
Industry: Finance Individual X is the most qualified to perform the job. However, the system predicts that future jobs will require individuals with experience in proposal writing with associated values in excess of $5,000,000 in the Banking industry. The system outputs a list that indicates Y or Z as the best individual for assignment of the job so they can gain experience in proposal writing for jobs of value greater than $5,000,000 and in the banking industry. The system may output an ordered list of preferred individuals as 1) individual Z; 2) individual Y; and 3) individual X.

Figure 3:
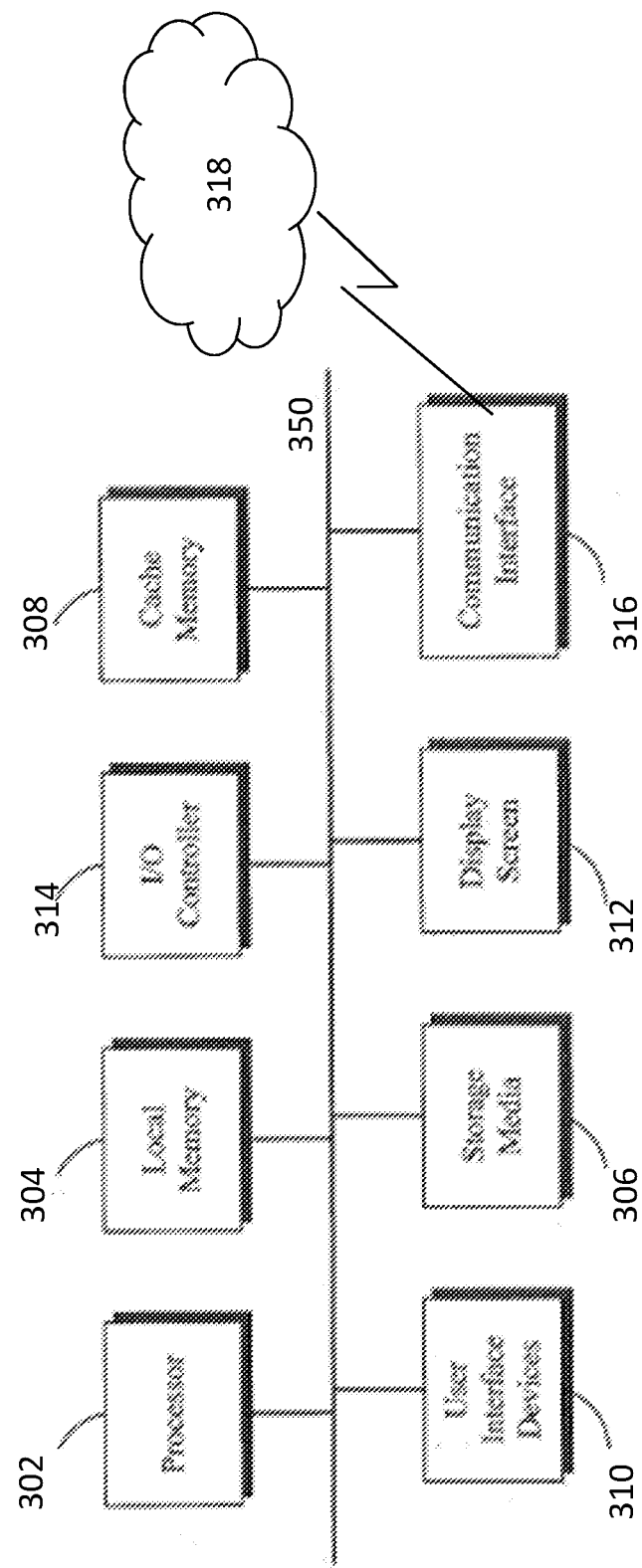
FIG. 3 depicts a block diagram of a system for implementing job assignment optimization according to an embodiment of the invention.

FIG. 3 is block diagram of a system upon which job assignment optimization may be implemented in an embodiment. In FIG. 3, the job assignment optimization may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. The methods and processes, when performed by a general purpose computing system or machine, convert the general purpose machine to a specific purpose machine.

Referring to FIG. 3, a computing system environment 300 in accordance with an exemplary embodiment may comprise logic units, circuits or other machinery and equipment that provide an execution environment for the components of software environment. In turn, the software environment may provide the execution instructions, including the underlying operational settings and configurations, for the various components of hardware environment.

The system 300 may comprise a processor 302 coupled to one or more storage elements by way of a system bus 350. The storage elements, for example, may comprise local memory 304, storage media 306, cache memory 308 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 302 loads executable code from storage media 306 to local memory 304. Cache memory 308 optimizes processing time by providing temporary storage that helps reduce the number of times code is loaded for execution. One or more user interface devices 310 (e.g., keyboard, pointing device, etc.) and a display screen 312 may be coupled to the other elements in the system 300 either directly or through an intervening I/O controller 314, for example. A communication interface unit 316, such as a network adapter, may be provided to enable the system 300 to communicate with local or remotely located computing systems, printers and storage devices via intervening private or public networks 318 (e.g., the Internet). Wired or wireless modems and Ethernet cards are a few of the exemplary types of network adapters.

It is noteworthy that the system 300, in certain implementations, may not include some or all the above components, or may comprise additional components to provide supplemental functionality or utility. Depending on the contemplated use and configuration, the system 300 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 316 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of the exemplary software elements may be also encoded in the hardware elements by way of configured and programmed processors, application specific integrated circuits (ASICs), field programmable gate arrays (FPGAs) and digital signal processors (DSPs), for example.

Technical effects and benefits include job assignment optimization. The job assignment optimization assigns jobs to individuals in a manner that maximizes the overall experience of the pool of individuals and also maximizes the preparedness of the individuals based on forecasted future jobs. The output of the job assignment optimization is a list of individuals that meet the minimum requirements of a job request and also balances the experience pool based on future predicted jobs. The exemplary job assignment optimization processes can be integrated with other workplace planning applications and may be used to augment job bidding tools.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
generating, via a computer processor, a job feature vector from features extracted from a new job request, each of the features associated with a constraint on minimum requirements with respect to a level of experience of a potential candidate for assignment to the new job request;
for each employee in an employee database, generating an employee feature vector that includes skills attributed to the employee and a number of instances that each of the skills has been completed by the employee;
searching the employee feature vectors generated from the employee database for the minimum requirements indicated in the feature vector generated from the new job request;
searching the employee feature vectors generated from the employee database for the minimum requirements indicated by constraints associated with the features in the new job request;
modeling aggregate utility of past experience of employees as a weighted sum of applied utility functions, wherein the utility functions factor in features extracted from predicted future job requests, and
wherein the features extracted from the new job request indicate a range of monetary values associated with the job;
generating, based on the modeling, a score indicating a difference between a potential post assignment utility and a pre-assignment utility;
outputting, via the computer processor, a list of qualified candidates that are ranked according to the score, the ranking, upon completion of the new job, furthering a balance in experience levels of the employees with respect to skills associated with the minimum requirements;
accessing one or more past jobs from a past jobs database;
generating, by a machine learning model, a demand feature vector comprising one or more features extracted from the one or more past jobs;
determining an anticipated demand from the demand feature vector by plotting the demand feature vector in a feature space of the machine learning model;

updating the list of qualified candidate based at least in part on the anticipated demand;
augmenting a job bidding tool based on the updating the list of qualified candidates.

2. The method of claim 1, wherein the features extracted from the new job request and the employee database include an industry and a brand.

3. The method of claim 1, wherein the features extracted from the predicted future job requests include probabilities that a next incoming job will contain positive values for each of the features.

4. The method of claim 1, wherein the utility function is a log function.

5. The method of claim 4, wherein the score is calculated as:
for a job with features i, where the individual has previously completed ei jobs with features i, the score is sum_i wi[log(ei+2)−log(ei+1)].

6. A system, comprising:
a memory having computer readable instructions; and
a processor for executing the computer readable instructions, the computer readable instructions including:
generating a job feature vector from features extracted from a new job request, each of the features associated with a constraint on minimum requirements with respect to a level of experience of a potential candidate for assignment to the new job request;
for each employee in an employee database, generating an employee feature vector that includes skills attributed to the employee and a number of instances that each of the skills has been completed by the employee;
searching employee feature vectors generated from the employee database for the minimum requirements indicated in the feature vector generated from the new job request;
searching the employee feature vectors generated from the employee database for the minimum requirements indicated by constraints associated with the features in the new job request;
modeling aggregate utility of past experience of employees as a weighted sum of applied utility functions, wherein the utility functions factor in features extracted from predicted future job requests, and
wherein the features extracted from the new job request indicate a range of monetary values associated with the job;
generating, based on the modeling, a score indicating a difference between a potential post assignment utility and a pre-assignment utility;
outputting a list of qualified candidates that are ranked according to the score, the ranking, upon completion of the new job, furthering a balance in experience levels of the employees with respect to skills associated with the minimum requirements;
accessing one or more past jobs from a past jobs database;
generating, by a machine learning model, a demand feature vector comprising one or more features extracted from the one or more past jobs;
determining an anticipated demand from the demand feature vector by plotting the demand feature vector in a feature space of the machine learning model; and
updating the list of qualified candidate based at least in part on the anticipated demand;
augmenting a job bidding tool based on the updating the list of qualified candidates.

7. The system of claim 6, wherein the features extracted from the new job request and the employee database include an industry and a brand.

8. The system of claim 6, wherein the features extracted from the predicted future job requests include probabilities that a next incoming job will contain positive values for each of the features.

9. The system of claim 6, wherein the utility function is a log function.

10. The system of claim 9, wherein the score is calculated as:
for a job with features i, where the individual has previously completed ei jobs with features i, the score is sum_i wi[log(ei+2)−log(ei+1)].

11. A computer program product comprising a computer readable storage medium having program instructions embodied therewith, wherein the computer readable storage medium is not a transitory signal per se, the program instructions executable by a computer processor to cause the computer processor to perform a method comprising:
generating a job feature vector from features extracted from a new job request, each of the features associated with a constraint on minimum requirements with respect to a level of experience of a potential candidate for assignment to the new job request;
for each employee in an employee database, generating an employee feature vector that includes skills attributed to the employee and a number of instances that each of the skills has been completed by the employee;
searching the employee feature vectors generated from the employee database for the minimum requirements indicated in the feature vector generated from the new job request;
searching the employee feature vectors generated from the employee database for the minimum requirements indicated by constraints associated with the features in the new job request;
modeling aggregate utility of past experience of employees as a weighted sum of applied utility functions, wherein the utility functions factor in features extracted from predicted future job requests, and
wherein the features extracted from the new job request indicate a range of monetary values associated with the job;
generating, based on the modeling, a score indicating a difference between a potential post assignment utility and a pre-assignment utility;
outputting a list of qualified candidates that are ranked according to the score, the ranking, upon completion of the new job, furthering a balance in experience levels of the employees with respect to skills associated with the minimum requirements;
accessing one or more past jobs from a past jobs database;
generating, by a machine learning model, a demand feature vector comprising one or more features extracted from the one or more past jobs;
determining an anticipated demand from the demand feature vector by plotting the demand feature vector in a feature space of the machine learning model; and
updating the list of qualified candidate based at least in part on the anticipated demand;
augmenting a job bidding tool based on the updating the list of qualified candidates.

12. The computer program product of claim 11, wherein the features extracted from the new job request and the employee database include an industry and a brand.

13. The computer program product of claim 11, wherein the features extracted from the predicted future job requests include probabilities that a next incoming job will contain positive values for each of the features.

14. The computer program product of claim 11, wherein the utility function is a log function, and wherein the score is calculated as:

for a job with features i, where the individual has previously completed ei jobs with features i, the score is sum_i wi[log(ei+2)−log(ei+1)].

* * * * *